T. TRIPP.
Metallic Packing for Piston-Rods.

No. 225,307. Patented Mar. 9, 1880.

Witnesses.
H. E. Lodge
Chas. H. Stadford

Inventor.
Thomas Tripp.
F. Curtis. Atty.

UNITED STATES PATENT OFFICE.

THOMAS TRIPP, OF EAST STOUGHTON, MASSACHUSETTS, ASSIGNOR TO THE AMERICAN METALLIC PACKING ASSOCIATION.

METALLIC PACKING FOR PISTON-RODS.

SPECIFICATION forming part of Letters Patent No. 225,307, dated March 9, 1880.

Application filed January 20, 1880.

*To all whom it may concern:*

Be it known that I, THOMAS TRIPP, of East Stoughton, in the county of Norfolk and State of Massachusetts, have invented certain new and useful Improvements in Metallic Packings for Piston-Rods, of which the following is a specification.

My present improvements relate to a class of sectional metallic packings for piston-rods heretofore invented and patented by myself, the distinguishing features of which consist in the employment of a sectional ring enveloping the rod, such ring being composed of twin semi-rings capable of sliding upon one another in a plane at right angles to the axis of the rod, and being maintained in a uniform plane by suitable guides, and crowded up to the rod from opposite sides by means which are controlled and adjusted from the outside of the cylinder-head, an important element in this class of packings being seen in the fact that it is susceptible of lateral slip upon the cylinder-head by and with any eccentric movements of the rod should the latter become bent or out of true from any cause.

In my present packing I retain the semi packing-rings and the annular disk shown in my patent above mentioned, but discard the inclined plane or cams therein shown, and substitute for them spiral springs, which permit the rings to adapt themselves to any irregularities or variations in the size or truth of the rod which they inclose, while at the same time the entire device is movable laterally with such rod, the packing-rings and springs being inclosed within an outer ring or hub, which in turn is bolted to the annular disk before named, but not so tightly as to prevent slip between the two, said springs exerting their stress between the hub and rings to crowd the latter up to the rod, while, to effectually break joints and prevent leakage of steam between the parts, I employ two sets or pairs of rings as against one pair shown in my patent.

Figure 1:
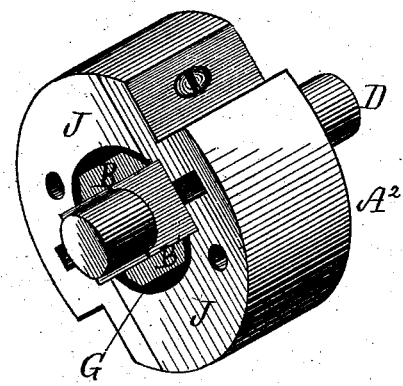
Figure 2:
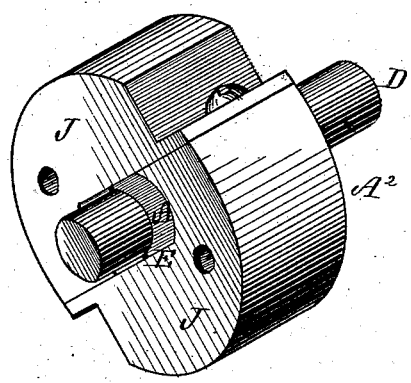
Figure 3:
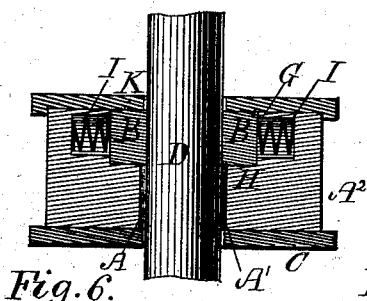
Figure 4:
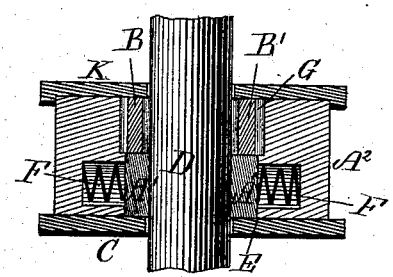
Figure 6:
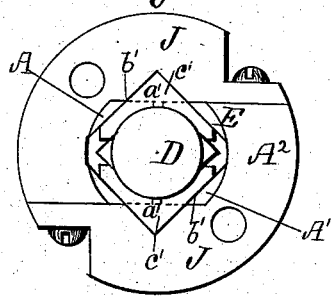
Figure 5:
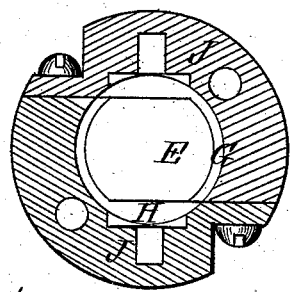
Figure 7:
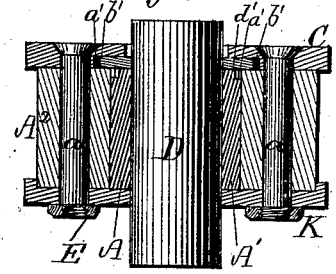

The drawings accompanying this specification and illustrating my invention represent, in Figures 1 and 2, perspective views of a packing containing my invention, Figs. 3 and 4 being cross-sections; Fig. 5, plan of hub. Figs. 6 and 7 represent, respectively, an inner end view and longitudinal section of the hub and packing-rings A A'.

In the above-named drawings, $A^2$ represents a stout ring or tubular hub or cylinder, secured at one end to the outer face of an annular plate or disk, C, by bolts *a a*, in such manner that while no steam can escape between them such slip of the two upon each other is permitted as shall allow the packing device to follow any irregular lateral movement of the piston-rod, the disk C in its turn being securely bolted to the cylinder-head, or the outstanding flange in which such cylinder-head usually terminates.

The two pairs of sectional packing-rings are shown at A A' and B B', the same being received within opposite ends of the hub $A^2$, and abutting endwise against each other and inclosing opposite sides of the piston-rod, which is shown at D.

The rings A A' are formed with straight parallel sides, and are received and slide within an inclosure, E, in one end of the hub $A^2$, and are crowded up to the piston-rod from opposite sides by springs F, placed one behind each plate and exerting its stress between such plate and the hub. The rings B B' are received and slide within an inclosure, G, in the opposite end of the hub, but with their parallel straight sides preferably arranged at right angles to those of the rings A A', in order to break joints, and the latter rings, B B', are so constructed as to be guided by and slide upon one another in lieu of in-guides within the hub, as is the case with the rings A A'.

To prevent escape of steam which might otherwise take place between the inner ends of the rings A A', I form the inclosure G larger than said rings, thus providing an offset or shelf, H, which is covered by the rings B B', thus furnishing a joint to prevent leakage of steam between the rings A A' and about the piston-rod.

The springs for advancing the rings B B' up to the piston-rod are shown at I I as arranged and operating in a manner similar to the springs F F, before named.

The hub $A^2$ may be an integral casting; but for convenience of manufacture I form it of two portions or semi-rings, J J, bolted securely together by bolts, as shown in Figs. 1, 2, and 5 of the drawings, the semi-rings of the hub being represented as bolted immovably together, with no slip or play toward and away from the piston-rod, the only play in this respect being between the packing-rings A A' B B'. I propose, however, in some classes of packing to place a block of metal between the abutting ends of the two portions of the limb, and in the event of failure or breaking of any one or more of the springs these blocks may be removed and the two portions of the rings crowded up to and so as to tightly inclose the piston-rod. In this manner I am enabled to provide against breaking of the springs and consequent leaking of steam.

K in the drawings represents an annular plate secured to the outer end of the hub, to prevent escape of the packing-rings at this point.

In Figs. 6 and 7 of the drawings, which respectively represent an inner end view and longitudinal section of the hub and packing-rings A A', I have shown an additional means of security against leakage of steam at the point where the piston-rod emerges from the cylinder-head. In this case I employ two crescent-shaped or semicircular plates, $a'$ $a'$, the inner faces or sides of which are sections of a circle equal to the circumference of the piston-rod. Consequently such plates surround the rod and are let into pockets $b'$ $b'$, created in part in the ends of the packing-rings A A' and in part in the end of the hub, in order that the outer surface of the whole may be flush, the plates $a'$ $a'$ being so arranged that they overlap or cover the adjacent ends of the packing-plates A A', in order to break the joints between such ends and the piston-rod and prevent access of steam by these joints.

Outside of the plates $a'$ $a'$, and snugly encompassing the piston-rod, I place a flat ring, $d'$, which covers the inner faces of the plates $a'$ $a'$ and the ends of the rings A A', and serves to prevent steam from the cylinder getting access to such rings.

The ring $d'$ is let into an annular recess or rabbet created in the outer end of the annular plate C, before named as serving to confine the hub and its accessories to the cylinder-head, the ring $d'$ being prevented from play longitudinally of the piston-rod, but being susceptible of lateral play within the plate C, in order to follow any irregular lateral movements of the rod.

In the event of using the segmental plates $a'$ $a'$ the packing-rings B B' may be dispensed with, and also the shelf or shoulder H in the bore of the hub, and the rings A A' would, in this event, be of equal length with said hub, as shown in Fig. 7 of the drawings.

It will be seen that the plates $a'$ $a'$ follow the movements of the packing-rings A A' as the latter close upon the piston-rod, except that the movements of the two are at right angles to each other; hence any movement of the rings by reason of wear or from any irregularity in the shape of the rod are followed by the plates and a tight joint about the rod secured.

Figure 8:
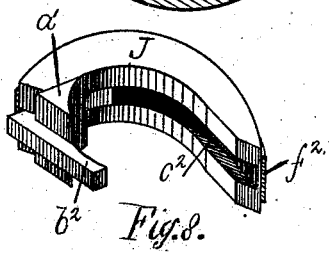

In Fig. 8 of the drawings I have shown a modification of the triangular plates $a'$ $a'$, in which such plates are elongated and extend entirely through the two halves of the hub, which latter are shown at J. In this case the plates $a'$ $a'$ directly hug the rod D on opposite sides, and are formed with outer projecting ledges, $b^2$ $b^2$, which enter corresponding grooves $c^2$ $c^2$ in the halves of the hub.

As the faces of the plates $a'$ $a'$ gradually become worn the oblique faces of the hub, being crowded together by springs $f^2$ $f^2$ encircling said hub, act upon the corresponding faces of the plates and crowd the latter toward the rod, while the ledges $b^2$ $b^2$ serve to break joints and prevent leakage of steam between the plates and hub.

I claim—

1. The packing-rings A A' B B', in combination with the hub or inclosing-ring $A^2$, and annular plate or disk C, substantially as described.

2. The rings A A' B B', in combination with the hub $A^2$ and disk C, and as pressed up to the piston-rod by springs suitably applied, substantially as and for purposes hereinbefore described.

3. The construction of the hub and packing-rings, as described, whereby the offset or ledge H is created in the hub, and one pair—viz., B B'—of rings covers or breaks the joint between the first-named rings and said ledge, substantially as hereinbefore described, and for purposes stated.

4. In combination, the hub or cylinder $A^2$, rings A A' B B', disk C, and cap or plate K, the hub and cap being secured to the disk and the latter bolted to the cylinder-head, and the whole operating substantially as stated.

5. In combination with the rings A A' and hub $A^2$, the plates $a'$ $a'$, serving to break the joints between the opposite ends of the said rings and prevent passage of steam between them and the piston-rod, substantially as explained.

6. The ring $d'$, in combination with the hub $A^2$, the packing-rings therein, the annular plate C, and segmental plates $a'$ $a'$, substantially as explained.

7. In metallic rod-packings containing sectional rings encircling the rod, the plates $a'$ $a'$, in combination with the rod and sectional rings, the plates moving up to the rod in a direction at right angles to that followed by the rings, and the whole being essentially as and for purposes stated.

8. The construction of the right-angular plate and hub, as shown in Fig. 8 of the accompanying drawings.

THOMAS TRIPP.

Witnesses:
 F. CURTIS,
 H. E. LODGE.